INVENTOR.
Albert Macovski
BY
[signature]
ATTORNEY

May 31, 1960 A. MACOVSKI 2,938,946

COLOR PROCESSING SYSTEM

Filed Dec. 20, 1956

8 Sheets-Sheet 2

INVENTOR.
Albert Macovski
BY
[signature]
ATTORNEY

May 31, 1960 | A. MACOVSKI | 2,938,946

COLOR PROCESSING SYSTEM

Filed Dec. 20, 1956 | 8 Sheets-Sheet 3

INVENTOR.
Albert Macovski
BY
[signature]
ATTORNEY

INVENTOR.
Albert Macovski
BY
[signature]
ATTORNEY

May 31, 1960 A. MACOVSKI 2,938,946

COLOR PROCESSING SYSTEM

Filed Dec. 20, 1956 8 Sheets-Sheet 5

INVENTOR.
Albert Macovski
BY
[signature]
ATTORNEY

May 31, 1960 A. MACOVSKI 2,938,946

COLOR PROCESSING SYSTEM

Filed Dec. 20, 1956 8 Sheets-Sheet 6

INVENTOR.
Albert Macovski
BY
[signature]
ATTORNEY

INVENTOR.
Albert Macovski
BY
[signature]
ATTORNEY

May 31, 1960 A. MACOVSKI 2,938,946

COLOR PROCESSING SYSTEM

Filed Dec. 20, 1956 8 Sheets-Sheet 8

INVENTOR.
Albert Macovski
BY
[signature]
ATTORNEY

United States Patent Office 2,938,946
Patented May 31, 1960

2,938,946

COLOR PROCESSING SYSTEM

Albert Macovski, Massapequa, N.Y., assignor to Radio Corporation of America, a corporation of Delaware Filed Dec. 20, 1956, Ser. No. 629,734
28 Claims. (Cl. 178—5.4)

The present invention relates to an improved circuit for applying video-modulated current to a kinescope in a television receiver and further relates to color television receivers wherein color information is applied to or processed or combined in a color kinescope. The present invention also relates to improved means for driving a kinescope whereby a beam current of the kinescope is linearly related to the instantaneous value of received television signal information.

In many types of television receivers of both the monochrome and the color television variety, the current in a kinescope is caused to be modulated with video information by using a driving circuit to vary the potential of the cathode or cathodes of the kinescope, in accordance with a received video information voltage, relative to the potential of one or more associated control electrodes in the electron guns. Kinescopes operated in the above manner have a nonlinear relationship between the applied video voltage and the intensity of the beam current produced in an electron gun. Also, variations in the kinescope from one or more electron guns can produce corresponding changes in loading for a driving circuit in a manner which will reduce the efficiency of operation of the television receiver and which can cause distortion or signal contamination of the intensity-modulations of the electron beam or beams of the kinescope.

It is therefore an object of the invention to provide an improved source of video-modulated current for the cathode or cathodes of a kinescope in a television receiver.

It is another object of the invention to provide a means for causing the beam current of the electron gun in a kinescope to vary in intensity with a linear relationship with respect to video information voltage applied to a circuit driving that electron gun.

It is a further object of the invention to provide simplified means for driving a color kinescope.

It is a further object of the invention to provide a color television receiver having a simplified design.

According to the invention, a constant-current, high-impedance driving circuit is used to provide video-modulated current to the cathode of the electron gun (or cathodes, in the case of a plurality of electron guns) of a kinescope in a television receiver. The beam current in the kinescope will vary linearly with respect to the video voltage used to control the constant-current, high-impedance driving circuit, and the current supplied to the cathode or cathodes of the kinescope by the constant-current, high-impedance driving circuit will be independent of the changes in cathode current and therefore the load presented to the driving circuit by the cathode circuit of the kinescope, these changes being caused by the modulation of the cathode current by the video voltage or by signals or potentials applied to other electrodes of the electron gun or guns.

Constant-current, high-impedance driving circuits of the present invention will be shown to be capable of providing simplified or improved operation of such television receivers as color television receivers which (*a*) apply entire component color signals to proper electron guns of a color kinescope, which (*b*) provide for signal addition of color information in the electron guns of the color kinescope, with different color information signals applied to different electrodes of the electron guns, or which (*c*) provide for demodulation of a color television signal in the electron beams of the color kinescope. A constant-current, high-impedance driving circuit of the present invention will also be shown to be an improved circuit for providing video information to the cathode of the electron gun of a kinescope of the type used in television receivers which only reproduce images in monochrome.

Other and incidental objects of the invention will become apparent on the reading of the specification and the study of the figures where:

Figures 1, 2, and 3 are block diagrams of constant-current, high-impedance driving circuits of the present invention which are used to apply current to the cathode of an electron gun in an electron flow tube.

*Constant-current circuits*

Figure 1:
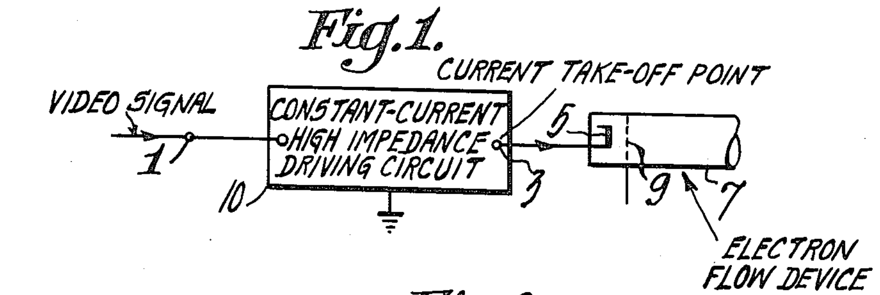

Reference will be made in this application to constant-current driving circuits. Constant-current driving circuits will hereinafter in this application be understood to be those driving circuits whose output current is independent of an external load, and to variations in the magnitude of that external load. For a discussion of elementary aspects of constant-current circuits, see, for example, Appendix C of "Electronic Circuits and Tubes" by the Cruft Electronics staff, published by McGraw-Hill in 1947.

In television receivers of the present invention, novel use is made of constant-current driving circuits for applying video-modulated currents to a current utilization means, such as a kinescope, where the external load may constitute the electron gun or guns of that kinescope. The aforementioned "novel use" makes possible improved kinescope operation and unique kinescope utilization not previously realized in television receivers.

*The television signal*

Before discussing circuits of the present invention, consider first certain aspects of the television signal, both monochrome and color, which will be useful for an understanding of both the operation of the circuits of the application and also of the benefits accrued from the use of the present invention. A monochrome type of television signal includes a band of signal components which describe the luminance or the brightness of a televised image. The information conveyed by the monochrome television signal is of the gray scale representation of the televised image and includes all shades of gray from black to white. The luminance or brightness information portion of the television signal is accompanied by picture synchronizing pulses and also by a sound modulated carrier which is transmitted 4½ mc. from the picture carrier. The luminance information portion of the monochrome television signal has a bandwidth from approximately zero to 4.2 mc. and is therefore seen to be a substantially wideband signal.

The color television signal, conforming to standards approved by the Federal Communications Commission, comprises a composite signal including the aforementioned luminance signal and a chrominance signal. As has been pointed out above, the luminance signal is a wideband signal which describes the monochrome or black and white information in a televised image. The chrominance signal is a modulated subcarrier which is modulated whereby the modulated-subcarrier information at each phase of the modulated subcarrier is indicative of one of a wide gamut of color difference signals, with the amplitude at that phase, when considered in combination with the luminance signal, providing an indication of the saturation of the particular color involved. The chrominance signal has a subcarrier frequency of 3.58 mc. and a bandwidth from 2 to 4.2 mc. The composite color television signal, when combined with a demodulated color difference signal, will provide information related to the component color corresponding to that color difference signal.

Color difference signal information is demodulated from the composite signal by mixing the modulated subcarrier with a demodulating signal having the frequency of the color subcarrier and the phase corresponding to the color difference signal being demodulated. In order to make possible the generation of accurately phased demodulating signals at a location remote from a broadcast transmitter, such as at a color television receiver, bursts of subcarrier frequency and of reference phase are included on the "back porch" of each horizontal synchronizing pulse of the composite signal.

Constant-current, high-impedance driving circuits are useful for supplying video-modulated current to a color kinescope in many types of color television receivers in a manner which will be described in the following specifications. In some of these color television receivers, the chrominance signal is separated from the composite signal; a plurality of required color difference signals are thereupon derived from the chrominance signal, and the resulting plurality of color difference signals are each combined with the composite or luminance signal either in the color kinescope or in circuits external to the color kinescope. In another form of color television receiver which will be seen to employ the driving circuit of the present invention in a unique fashion, the need for separate circuits for processing the chrominance signal information is eliminated by developing the required component color signals directly in the color kinescope thereby achieving a simplification of circuitry and a considerable saving in cost.

*Constant-current, high-impedance driving circuits*

When a voltage amplifier is used to produce an amplified voltage in response to a video signal, with the amplified voltage thereupon used to determine the potential of, say, the cathode or cathodes of a kinescope with the purpose of controlling the current through the kinescope, the voltage developed at the cathode will be dependent upon the impedance presented to the voltage source by the circuit consisting of the electron flow path between the cathode of the kinescope and one or more of the other electrodes of that kinescope. Also, when a voltage source is used to supply a controlling voltage to the cathode of a kinescope, the current through that kinescope, responsive to the applied voltage, will in general, be determined by a nonlinear characteristic relationship which is well-known by those skilled in the art to exist between the beam current and the voltage between the electron gun cathode and a control grid of that electron gun.

A constant-current, high-impedance driving circuit of the present invention may be optimally employed to provide a video-modulated current to the cathode or cathodes of a kinescope in a manner whereby the electron beam current in the kinescope will be a linear function of the voltage applied to the constant-current, high-impedance driving circuit and where that electron beam current will not cause any loading of the constant-current, high-impedance driving circuit which will have an effect on the amount of current which is produced by the latter-named circuit.

Figure 1 is a block diagram of a circuit of the invention which is employed to drive or supply a modulated current to an electron flow tube, such as (though not exclusively) a kinescope. A video signal is applied to an input terminal 1 of the constant-current, high-impedance driving circuit 10. The constant-current, high-impedance driving circuit 10 has a current take-off point 3 which is connected to the cathode 5 of the electron flow tube 7. The electron flow tube 7 has a control grid 9. The current which is provided to the cathode 5 from the current take-off point 3 is a current which varies in intensity with the voltage applied to the terminal 1. This voltage represents the video signal.

Hereinafter in the specification, the video signal may alternatively constitute a monochrome signal in the case of a monochrome television signal receiver or may constitute a composite television signal in the case of a color television signal receiver unless more specifically identified.

In the circuit of Figure 1 the cathode 5 and the control grid 9 of the electron flow tube 7 may constitute the cathode and first control grid of an electron gun of a kinescope. It is to be understood that the present discussion is not limited to electron flow devices such as kinescopes where only a single electron gun of a single cathode is included. Rather, electron flow devices may comprise, for example, other electron tubes or semiconductor devices, or a color kinescope having a trio of electron guns. A single constant-current, high-impedance driving circuit of the invention may be used to supply a common current to all of the cathodes of the trio of electron guns or a plurality of separate constant-current, high-impedance driving circuits may be used to supply currents to the cathodes of the trio of electron guns; circuits illustrating these aspects will be described later in the specification.

When a constant-current, high-impedance driving circuit 10 is used in a television receiver for applying a current representing a wideband video signal to the cathodes of a kinescope, it is necessary that the circuit 10 be capable of properly processing all of the signal frequencies constituting the wideband video signal. In general, the constant-current, high-impedance driving circuit 10 will include a current take-off terminal which has a certain amount of capacitance to ground. Also, a non-negligible capacitance will be provided to ground from the cathode or cathodes of the kinescope. In order to make the constant-current, high-impedance driving circuit 10 wideband, it is therefore necessary to design the circuit 10 so that the various capacitances to ground are prevented from attenuating the output of the circuit 10 at the higher frequencies of the video signal.

Figure 2:
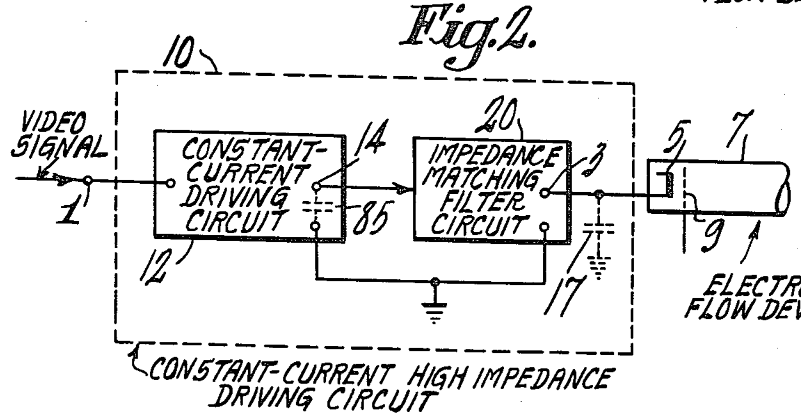

A constant-current, high-impedance driving circuit 10 including the above feature is shown in Figure 2. This driving circuit 10 includes a constant-current driving circuit 12 which has a current take-off point 14. A capacitance 85 is present between the current take-off point 14 and ground. The cathode 5, which is to be coupled to the main current take-off point 3 of the constant-current, high-impedance driving circuit will also present a capacitance 17 between cathode and ground. The present invention therefore features an impedance matching filter circuit 20 which is coupled between the current take-off point 14 of the constant-current driving circuit 12 and the current take-off point 3 at the cathode of the electron flow tube 7, which corrects for the capacitive loading provided by the condensers 85 and 17 and provides a proper capacitance match between the current take-off points 14 and 3.

Figure 3:
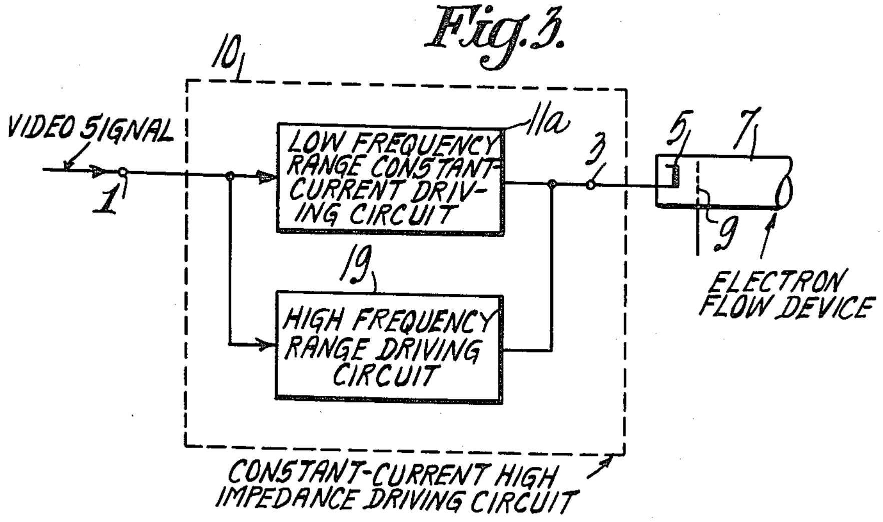

In another form of constant-current, high-impedance driving circuits of the present invention, as shown in Figure 3, a low-frequency range constant-current, high-impedance driving circuit 11a is shunted by a high-frequency range driving circuit 19 which provides the capacitive current at the higher frequencies in, for example, the chrominance signal region of a color television signal. The output current of the combined circuit forming the constant-current, high-impedance driving circuit 10 is provided from the output terminal 3 to the cathode 5 of the electron flow tube.

Figures 4–7 are detailed schematic diagrams of different forms of constant-current, high-impedance driving circuits which may be used to provide currents, modulated in accordance with video information, which will include color information during color transmission to the cathode or cathodes of a color kinescope. These constant-current, high-impedance driving circuits of Figures 4–7 illustrate successfully operated circuits which form embodiments of the circuits of Figures 1–3. The circuits of Figures 4–7 show the electron gun of the kinescope 13, whose neck is pictured therein to include a single cathode 11; in the case where the constant-current, high-impedance circuit 10 drives a color kinescope, the single cathode 11 may be considered as representing the trio of cathodes which are included in the electron gun trio of the color kinescope.

Figures 4, 5:
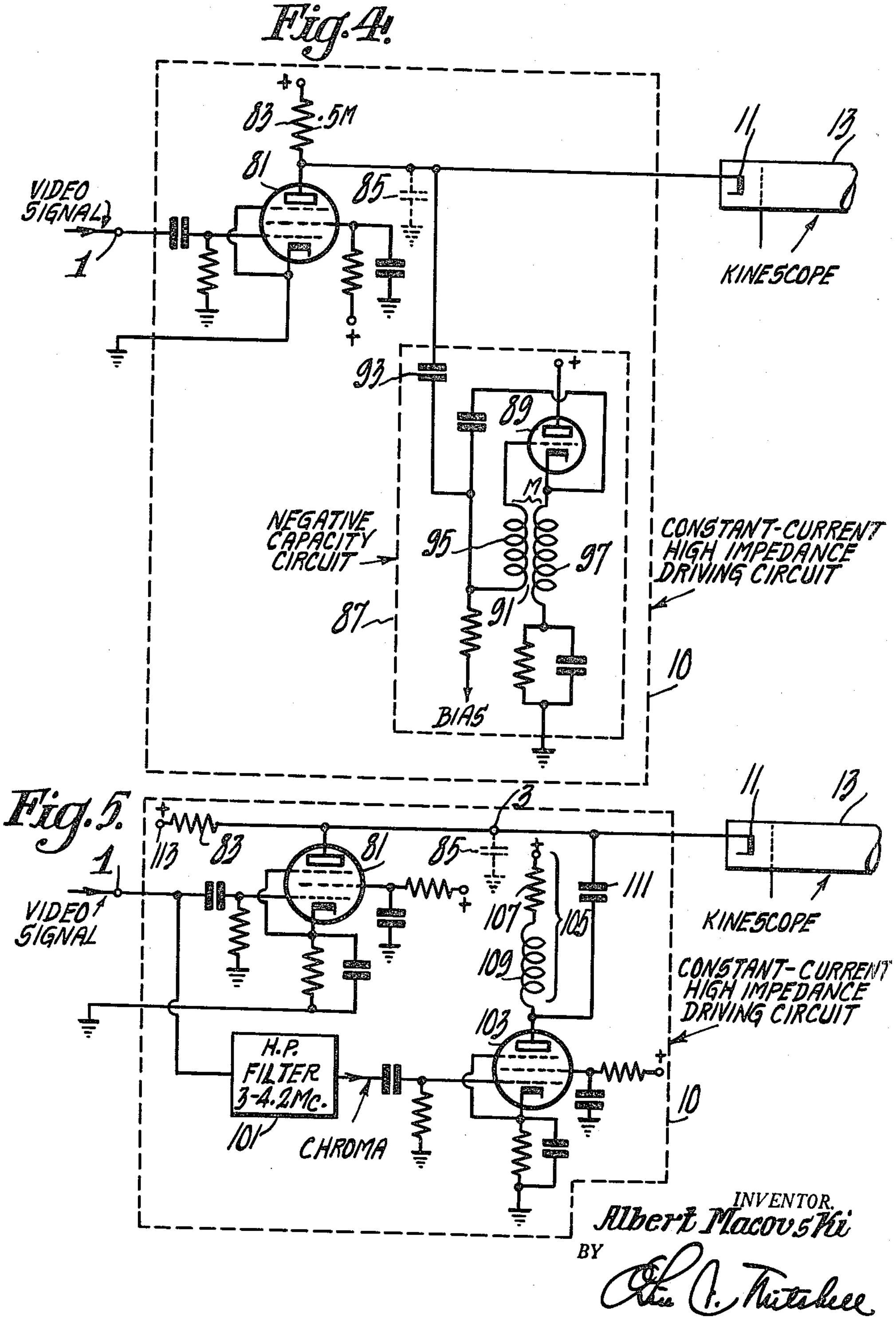
Figures 4–7 are schematic diagrams of constant-current, high-impedance driving circuits of the present invention.

The constant-current, high-impedance driving circuit 10 of Figure 4 is one form of the present invention. The constant-current, high-impedance driving circuit 10 of that figure includes an amplifier tube 81 having a very high resistance anode load 83. The anode load 83 has a resistance of ½ megohm as compared to resistance of 5,000 or 10,000 ohms which are commonly used in the anode loads of amplifiers.

The video signal is applied to the control grid of tube 81; the high resistance anode load 83 is coupled to the cathode 11 of the kinescope 13 from the anode terminal which forms the current take-off point 3. In virtue of the use of a very high resistance anode load 83, the tube 81 will comprise a constant-current, high-impedance source of the video signal to the cathode 11 for at least the lower frequencies of the video signal; however, in virtue of the use of so high a resistance for the anode load, the anode-to-ground capacitance 85 at the current take-off point 3 becomes a circuit parameter of considerable importance inasmuch as this anode-to-ground capacitance 85 has the effect of capacitive loading the anode load 83 and thereby reducing the impedance of the circuit in the higher frequency region of the video signal, such as in the chrominance signal region of the color television signal.

The capacitance loading of the capacitance 85 is greatly reduced by connecting a negative capacity circuit 87 in shunt with the capacitance 85. Negative capacity circuits are known in the art and are described, for example, in Appendix A, pages 767–770 of the book, Waveforms, which is vol. 19 of the Radiation Laboratory Series, published by the McGraw-Hill Book Company.

A negative capacity circuit, which has operated satisfactorily in a television receiver of the present invention, is included in Figure 4, where it illustrates an embodiment of the negative capacity circuit 87. The negative capacity circuit 87 shown in Figure 4 is a cathode follower circuit with positive feedback. The negative capacity circuit 87 of Figure 4 uses a triode 89. A transformer 91 couples the control grid and the cathode of the triode 89. Video signal components coupled to the control grid of triode 89 by way of condenser 93 and the primary winding 95 of the transformer 91 are amplified in the triode 89 and reintroduced into the control grid circuit of triode 89 from the secondary winding 97 of transformer 91 in such a phase as to provide the effect of a negative capacity. The negative capacity 87 is a stable arrangement which is operated to substantially cancel the effect of the capacitance 85 on the operation of the tube 81 and the anode load 83. The tube 81 and the anode load 83, responsive to the composite signal, thereupon functions as a constant-current, high-impedance driving source of the video signal for driving the cathode 11 of the color kinescope 13.

Figure 5 is a schematic diagram of another embodiment of a constant-current, high-impedance driving circuit 10 of the present invention. The circuit of Figure 5 includes a tube 81 and an anode load 83; the video signal is developed across the very high resistance anode load 83 and applied therefrom to the cathode 11 of the kinescope 13. Compensation for the loss of gain of the tube 81 as a result of, for example, the anode-to-ground capacitance 85 is accomplished in the circuit of Figure 5 by use of an auxiliary circuit which passes and amplifies the high frequency signal components of the video signal. This auxiliary circuit includes the high-pass filter 101 and the circuit of the tube 103.

The video signal is applied to the high-pass filter 101 which has a passband from 3 to 4.2 mcs. The high-pass filter may alternatively have a passband in the range from 2 to 4.2 mc., which represents, for example, the frequency range of a chrominance signal including high-frequency brightness components. The output of the high-pass filter 101 is the high-frequency video information which is applied to the control grid of tube 103. The anode load 105 of tube 103 is a load which includes a resistance 107 and an inductance 109 which are designed to provide suitable gain and high-frequency response to the high-frequency video information and also provide a substantially high impedance source to this information signal. The amplified high-frequency video information is thereupon applied, by way of the condenser 111 to the current take-off point 3, which is coupled to the anode of tube 103, and therefrom to the cathode 11 of the kinescope 13. The circuit of Figure 5 has the additional advantage of providing control of the relative amplitude level of the high-frequency video information as compared to the relative amplitude level of the luminance signal.

The circuit of Figure 5 requires a smaller value of resistance of the anode load 83 than that used in, say, the circuit of Figure 4 without detracting from the constant-current performance of the circuit of Figure 5; by using a smaller value of resistance for the anode load 83, the capacitance loading of the current take-off point 3 by the capacitance 85 becomes of less importance. In one circuit which was constructed for practicing the invention according to the circuit of Figure 5, the anode load 83 had a resistance of 56,000 ohms when used in conjunction with a tube 81 consisting of a 6AW8; 1,000 volts was applied to the anode terminal 113 with 200 volts applied to the screen grid of 6AW8.

Figure 6:
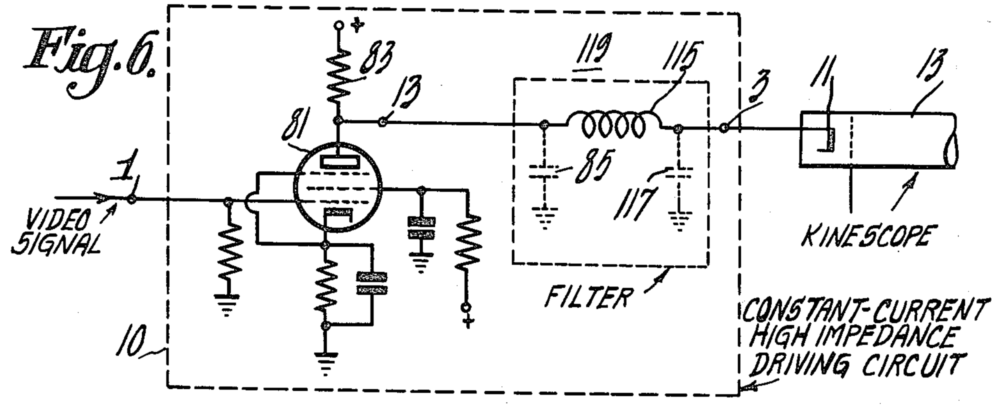

Figure 6 is a constant-current, high-impedance driving circuit 10 of the present invention which provides means for increasing the impedance of the driving circuit in the vicinity of high-frequency video information, such as the chrominance signal frequencies, to reduce the driving-current requirements. A tube 81 is used with an anode load 83. The anode-to-ground capacitance 85 is operatively connected with an inductance 115 and the capacitance 117 (capacitance 117 may be the capacitance-to-ground of the cathodes 11) to form a low-pass filter which functions as a high-frequency peaking circuit 119. The high frequency peaking circuit 119 is connected between the current take-off point 13 of the anode of tube 81 and the current take-off point 3 of the driving circuit 10 and therefrom to the cathode 11 of the kinescope 13. The high-frequency peaking circuit functions to prevent a reduction in level of the high-frequency video information and to cause the high-frequency video information to be applied to the cathode 11 by a constant-current, high-impedance source. In one circuit constructed for practicing the invention according to the circuit of Figure 6, the anode load 83 utilized a resistance of 30,000 ohms; the inductance 115 had a value of 100 μh.

Figure 7:
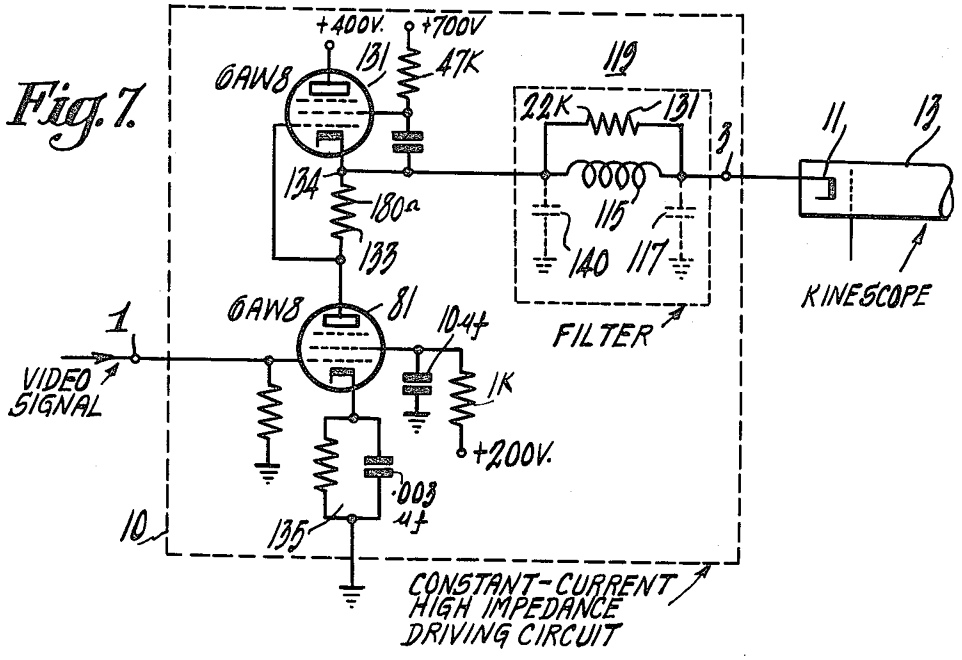

The constant-current, high-impedance driving circuit of Figure 7 is a circuit which employs pentodes 81 and 131. The pentode 131 functions as the anode load for the pentode 81. Since pentode 131 is, essentially speaking, a constant-current device of extremely high impedance, the pentode 81 will function as an electron tube having a very high impedance anode load and will therefore function as a constant-current source of any video signal applied to its control grid.

The pentodes 81 and 131 of Figure 7 are coupled to uniquely provide a source of current to the cathode 11 of a kinescope 13 whereby not only are the aforementioned constant-current characteristics provided by the circuit but also (*a*) the pentodes 81 and 131 are capable of providing currents of unusually large magnitude to the cathode 11 and (*b*) the pentodes 81 and 131 are capable of providing a current swing which is at least twice as large as the current swing capable of being provided by either pentode.

A detailed description of the operation of the driving circuit 10 of Figure 7 is discussed as follows so that a full appreciation of both this operation and the benefits of its use will be provided.

The anode of pentode 81 is connected by way of a resistor 133 to the cathode of the pentode 131, which functions as the anode load of pentode 81. The voltage developed at the anode of pentode 81 is connected to the control grid of pentode 131. A current take-off point 134, at the cathode of pentode 131 is coupled by way of a circuit 119 to the current take-off point 3 of the driving circuit 10 and therefrom to the cathode 11. The resistor 133 is a small size, having a typical value of 180 ohms when pentodes of the 6AW8 variety are used. As current through the pentode 81 increases, an increasingly large voltage will be developed across the resistor 133 which will bias the control grid of the pentode 131 in a negative direction, thereby reducing the current through the latter-named pentode. The current provided from the current take-off point 134 to the cathode 11 of the kinescope 13 will consist of the sum of the current of one polarity from the pentode 181 and the current of opposite polarity from pentode 131.

As the current through pentode 81 increases, the current through pentode 131 will decrease; and as the current from pentode 81 decreases, the current through pentode 131 will increase. The current from the current take-off point 134 will be equal to the difference between the currents passing through pentodes 81 and 131.

Considering the operation of pentodes 81 and 131 of Figure 7 in more detail, let the resistance 133 be equal in magnitude to 1/gm. of the pentode 131 so that the pentode 81 will, for all practical purposes, operate into its own plate resistance. With proper voltages applied to the control electrodes of the two pentodes 81 and 131, the current through the pentodes 81 and 131 is caused to equal, say, 10 ma. when a video signal applied to the control grid of pentode 81 has a zero value. With both pentodes 81 and 131 in a quiescent state when the video signal has zero value, and with pentodes 81 and 131 both passing 10 ma. of current, the total current available at the current take-off point 134 for transmission to the cathode 11 by way of the circuit 119 is equal to zero. Let the video signal assume a positive value so that the current through the pentode 81 is increased to 15 ma.; the increased voltage drop across the resistance 133 will decrease the current through pentode 131 to 5 ma. and 10 ma. will be available at the current take-off point 134. As the current through pentode 81 is further increased to 20 ma. by an increase in the positive value of the video signal, the current through pentode 131 will be reduced to zero and a total of 20 ma. of current will be available at the current take-off point 134. It is to be noted that at all times the sum of the currents passing through pentodes 81 and 131 has remained constant at 20 ma.; pentodes 81 and 131 act as different reservoirs of current for commonly providing current to the current take-off point 134.

When the composite signal changes to a negative value to cause, say, 5 ma. to flow through pentode 81, then the decrease in voltage across the resistor 133 will cause the current through pentode 131 to increase to 15 ma.; 10 ma. of current of negative polarity will be available at the current take-off point 134. When the composite signal varies to cause the current through pentode 81 to go to zero, the current through pentode 131 will increase to 20 ma., and 20 ma. of current of negative polarity will be available at the current take-off point 134. Again, as in the case where the composite signal achieves positive values, the sum of the currents through both of the pentodes 81 and 131 is maintained substantially constant at 20 ma.

The constant-current, high-impedance driving circuit 10 of Figure 7 is therefore recognized as a circuit which provides a current to a current sink such as the cathode of a kinescope in a manner whereby the current applied to the current sink is a function of only the voltage applied to the control grid of pentode 81.

In the constant-current, high-impedance driving circuit 10 of Figure 7, a distributed capacitance 140 will be present at the current take-off point 134. In order to prevent this capacitance from presenting a capacitance load to the current take-off point 134, in a way that will cause deterioration of the high frequency performance of the driving circuit 10 of the present invention, an inductance 115 is connected between the current take-off point 134 and the current take-off point 3 of the driving circuit 10 at the cathode 11 of the kinescope 13. A resistance 137 is connected in shunt with the inductance 115; it is noted that a capacitance 117, representing the capacity to ground of the cathode 11, forms a parameter of the filter network 119. The filter network 119 is designed so that high-frequency information signal components in, say, the chrominance signal range of a color television signal or in the higher frequency range of a monochrome television signal, will be presented to the cathode 11 by way of a high impedance.

*A kinescope color processing circuit*

A type of color television receiver in which the constant-current, high-impedance driving circuit of the present invention is employed with great benefit is that type of color television receiver wherein the color television signal information is processed within the color kinescope. As will be seen, the use of a constant-current, high-impedance driving circuit of the present invention in the above-mentioned type of color television receiver, for applying a color television signal to the cathodes of the electron guns of a color kinescope and wherein color information will be derived in the electron guns by signals applied to other electrodes of the electron guns, will prevent changes in cathode current intensity, other than those changes produced by the color television signal at the cathodes, which would otherwise cause a deterioration in the quality of a reproduced image.

Figure 8:
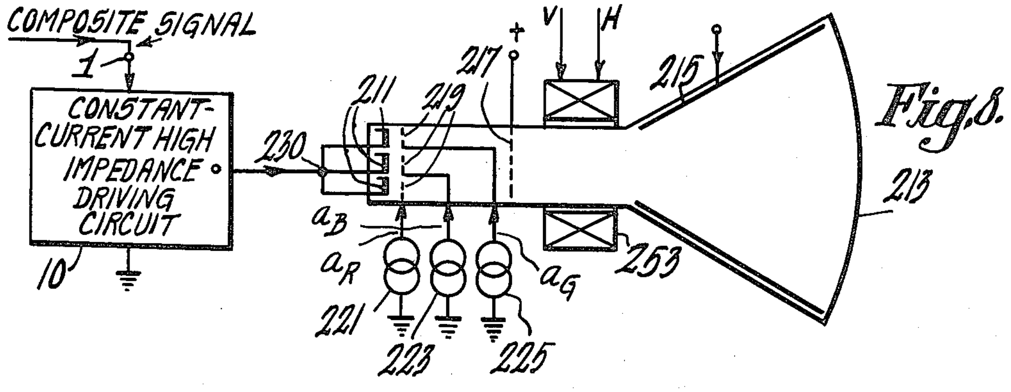
Figure 8 is a circuit diagram of a kinescope color-processing system of the present invention wherein the color television signal is demodulated within the color kinescope.

Figure 8 is a diagram of a kinescope color processing circuit of the present invention. The composite color television signal, termed the composite signal, is applied to a constant-current, high-impedance driving circuit 10 which applies the composite signal to all the cathodes 211 of the color kinescope 213. The color kinescope 213 is a tricolor kinescope, capable of producing red, blue, and green images and includes an ultor or second anode 215, a first anode 217, and the control grids 219, whose potentials control the intensity of the beam current issuing from the cathodes 211.

A trio of demodulating signal sources 221, 223, and 225 are provided; each of the demodulating signal sources 221, 223, and 225 is coupled to a corresponding control grid of the control grids 219. The phases of the demodulating signals, provided by the demodulating signal sources 221, 223, and 225 (these phases will be described in detail), are so phased that the demodulating signal sources 221, 223, and 225 modulate each of the electron beams to demodulate corresponding color difference signal information directly into each electron beam where it is combined with the luminance signal portion of the composite signal to produce a component color signal; as a result, one of a trio of red, blue, and green component color signals is developed in each of the corresponding electron beams to which the composite signal and a demodulating signal of proper phase is applied.

A constant-current, high-impedance driving circuit 10 is used in accordance with the present invention for applying the composite signal to the cathodes 211 of the color kinescope 213. For efficient kinescope demodulation, it is necessary for the constant-current, high-impedance circuit 10 to provide a large driving impedance for at least the low-frequency range 0–1 mc. where the color difference signals are developed; some reduction of driving impedance may be made in the chrominance signal range. The impedance of the constant-current, high impedance driving circuit 10 is designed to be considerably larger in magnitude than the reciprocal of the transconductance of the electron guns of the color kinescope 13.

One of the benefits of using a constant-current, high-impedance source for applying the composite signal to the cathodes 211 of the kinescope 213 is that the demodulation of the color difference signal information and the combining of the demodulated color difference signal information with the luminance or composite color information to form component color signals, will take place within the kinescope guns, thereby eliminating the need of auxiliary demodulating circuits, the kinescope guns will differentially share the driving current from the current take-off point 3 of the constant-current, high-impedance source 10 which applies the composite signal to the cathodes 211 of the color kinescope 213. The driving current varies in amplitude in accordance with the composite signal; however, the total current to the cathodes of the color kinescope 213 must vary only in accordance with composite signal information and not with any variation of the potentials of the control grids 219 of the color kinescope 213. This requires that the total electron beam current, corresponding to each value of composite signal information, remain fixed regardless of the distribution of currents from each of the cathodes 211; this requirement is achieved by having a change in one direction of the current from one cathode accompanied by a corresponding change in the other direction of the current from the other cathodes. A benefit of this type of operation is that demodulation of the color difference signal information in the electron beams is accomplished with demodulating signals of relatively low amplitude—somewhat under 100 volts peak-to-peak in a conventional color kinescope such as an RCA21*ax*–P22.

The use of a constant-current, high-impedance driving circuit 10 has the additional advantage in that when the control grid of one electron gun is, say, sharply increased in potential by a demodulating signal, the potential at the cathode of that electron gun will follow this increase in potential therefore increasing the potential of all of the cathodes 11. In this way the cathodes of the electron guns whose control grids are not being increased in amplitude are caused to have increasingly negative potential relative to their control grids, thereby further reducing the current from the cathodes whose control grids are not at that instant being increased in amplitude or riding a positive peak of demodulating signal voltage. Thus, accurate and uncontaminated color difference signal demodulation in each of the electron beams is accomplished, making it possible for the high fidelity reproduction of the televised image on the target area of the color kinescope.

There are numerous choices of phases of demodulating signals which may be used to produce a reproduced image having proper hue and saturation. These phases are phases of the frequency of the color subcarrier; this frequency is 3.58 mc. The frequency of the color synchronizing bursts is the same as the frequency of the color subcarrier.

Figure 9:
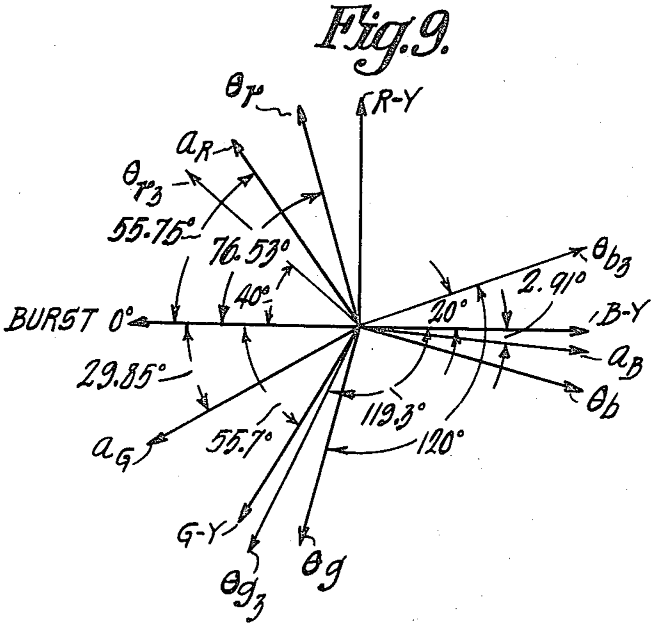
Figure 9 is a vector diagram which relates the phases of various color difference signals which are included in a chrominance signal of the color television signal.

Figure 9 is a vector diagram illustrating the phases of many of the color difference signals which are pertinent to the discussion. Included in Figure 9 are, for example, the $R-Y$, $B-Y$, and $G-Y$ color difference signals; R, B, and G denote red, blue, and green, respectively, and Y denotes the luminance signal. The addition of either the $R-Y$ or the $B-Y$ color difference signals to the luminance (Y) signal will, for example, produce red and blue component color signals.

It is difficult to demodulate the chrominance signal in the color kinescope at the $R-Y$, $B-Y$, and $G-Y$ phases and produce a reproduced image having proper color saturation since the $R-Y$, $B-Y$, and $G-Y$ color difference signal information is included in the chrominance signal at different relative amplitudes according to the proportions .877, .493, and 1.423, respectively. Reproduction of the televised image with proper saturation has been accomplished in a kinescope processing circuit of the present invention by demodulating in the color kinescope at phases other than the $R-Y$, $B-Y$, and $G-Y$ phases.

Consider the case where the color kinescope 213 is to reproduce exact hues. The exact red hue is defined as the hue of the red color output of the color kinescope 213 when the green and blue color outputs of the color kinescope 213 are identical and have lower amplitude than that of the red. In the case of a fully saturated red color, the green and blue color outputs will be zero. The exact blue and green hues may be similarly defined.

Let the angles of the demodulating signals be denoted as $a_R$, $a_B$ and $a_G$ relating to red, blue, and green color information, respectively. The chrominance signal includes red, blue, and green color-phase vectors, $\theta_r$, $\theta_b$, and $\theta_g$, which are transmitted at so-called transmitter angles; that is, the red color-phase vector, $\theta_r$, lags the burst phase by 76.53°, with the blue and green color-phase vectors, $\theta_b$ and $\theta_g$, lagging the burst phase by 192.95° and 299.33°, respectively. During the processing of a composite signal in a color kinescope, the green and blue color output of the color kinescope will be equal when the demodulating signal angles controlling the green and blue color outputs are each equally spaced from the phase of the transmitted red color phase corresponding to the vector $\theta_r$ of Figure 2. In like fashion, the red and blue outputs will be equal when their demodulating angles are equally spaced from the angle of the transmitted green color phase vector $\theta_g$; the red and green outputs will be equal when their angles are equally spaced from the phase angle of the transmitted blue color-phase vector $\theta_b$.

For the exact red hue, the difference between each of the green and blue demodulating signal angles $a_G$ and $a_B$ and the red transmited angle $\theta_r$ is set to be equal. That is $$a_B-\theta_r=\theta_r+360°-a_G$$

Similiarly, for exact green and blue hues $$a_G - \theta_b = \theta_b - a_R$$

$$a_R + 360° - \theta_g = \theta_g - a_B$$

Solving these three equations for the three unknowns, $a_R$, $a_B$, and $a_G$, it is found that for exact hues to be reproduced by the color kinescope 213. The demodulating signal angles $a_R$, $a_B$, and $a_G$ must have the following phase angles relative to burst phase:

$$a_R = 55.75°$$

$$a_B = 182.91°$$

$$a_G = 330.15°$$

The preceding discussion has described which demodulating signal angles must be used at the kinescope control grids for obtaining exact hues from the color kinescope 13; these angles were corroborated in an experimental receiver. The kinescope processing circuit of the present invention was alternatively operated whereby the respective control grids of electron guns were energized by the demodulating signals, $\theta_{r3}$, $\theta_{b3}$, and $\theta_{g3}$, having relative phases at 0°, 120°, and 240°, with respect to each other; these phases are illustrated in Figure 9 where $\theta_{r3}$ is seen to have a phase which lags burst phase by 40°. The latter choice of demodulating signal angles was found to give quite satisfactory results relative to the reproduced image. By properly proportioning the amplitude of the demodulating signals, $a_R$, $a_B$, and $a_G$, the contributions of each of these demodulating signals which are induced from the control grids 219 to the cathodes 211 will cancel at the common terminal 230 of cathodes 11 to prevent their being developed at terminal 230, a signal derived from the demodulating signals which might contaminate the composite signal being developed there by the constant-current, high impedance driving circuit 10.

Figure 10:
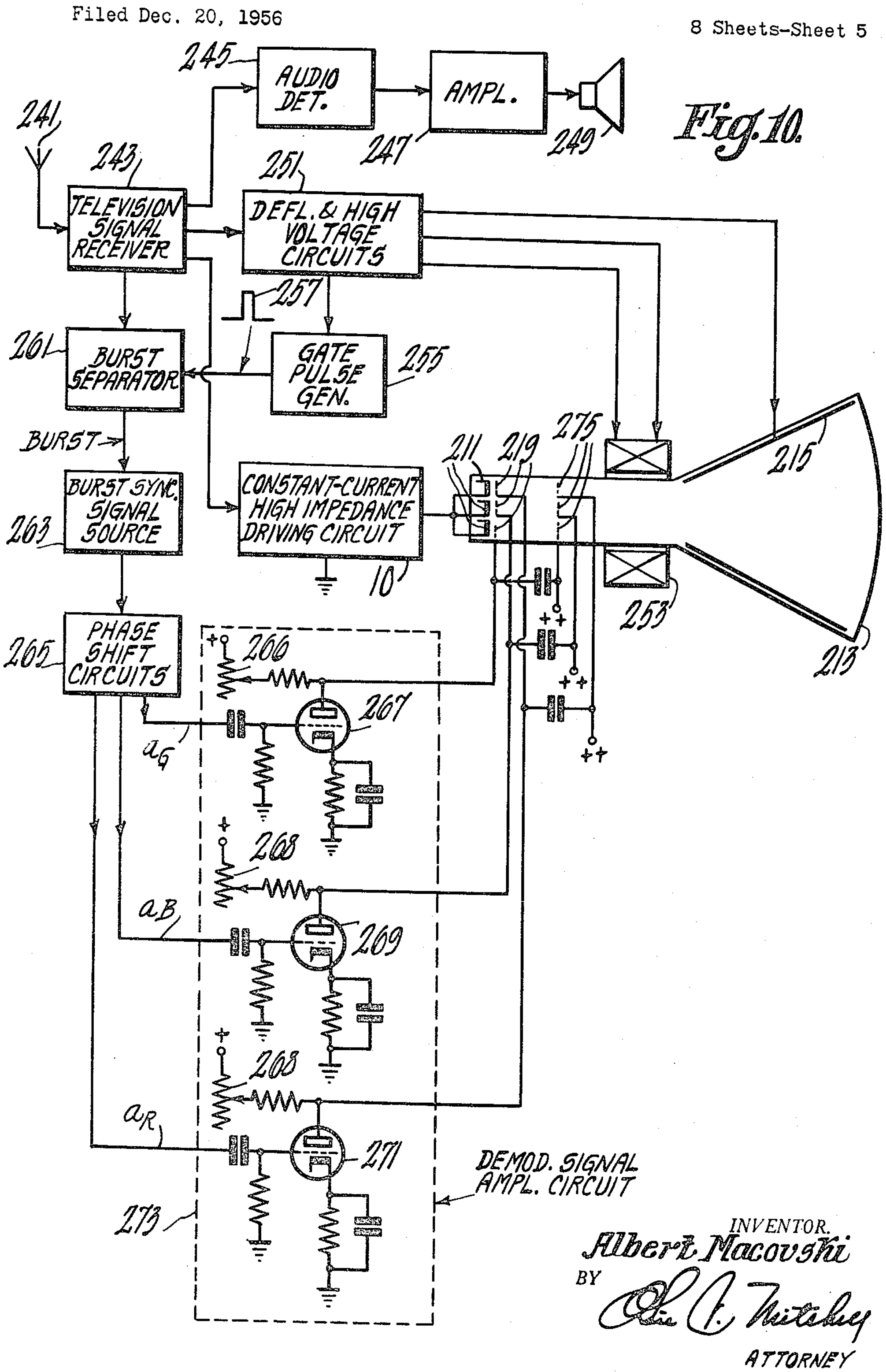
Figures 10–13 are diagrams of color television receivers of different design which use constant-current, high-impedance driving circuits of the present invention for applying color information modulating current to the cathodes of a color kinescope.

Figure 10 is a block diagram of a color television receiver which processes the color information within the kinescope 213 according to the present invention. The receiver circuit of Figure 10 is intended to show in more detail how a circuit of the type shown in Figure 8 is included in an over-all color television circuit.

An incoming signal from a broadcasting station is received at the antenna 241 and applied to the television signal reciver 243. The television receiver 243 demodulates the color television signal from the incoming signal; the demodulated color television signal is the composite signal which includes the luminance and chrominance signals, and also deflection synchronizing signals, color synchronizing bursts, and a sound-modulated, frequency-modulated carrier which is transmitted 4½ mc. removed from the picture carrier.

Using, for example, an intercarrier sound circuit, the sound information is demodulated in the audio detector 245. The demodulated sound information is amplified in the amplifier 247 and applied to the loudspeaker 249.

The color television signal is applied to the deflection and high voltage circuits 251 which separate the deflection synchronizing signals from the color television signal and develop therefrom vertical and horizontal deflection signals which are applied to the deflection yokes 253 and a high voltage which is applied to the ultor 15. In addition, the deflection and high voltage circuits 251 energize a gate pulse generator 255 which develops a gate pulse 257 having a duration interval substantially equal to and in time coincidence with the color synchronizing bursts following horizontal synchronizing pulses. The gate pulse generator 255 is often included in a color television receiver in the form of an auxiliary winding on a transformer of the deflection and high voltage circuits. However, the gate pulse generator 255 may also take the form of a multivibrator which is responsive to horizontal synchronizing pulses.

The gate pulse 257 is applied to the burst separator 261 to which is also applied the color television signal. The burst separator 261 is a gate circuit which, responsive to the gate pulses 257, separates the color synchronizing bursts from the color television signal and applies the separated bursts to the burst synchronized signal source 263. The burst synchronized signal source 263 is a circuit which, responsive to the separated bursts, develops a substantially continuous signal having the frequency of the bursts and a phase prescribed by the bursts. The burst synchronized signal source 263 may take the form of an oscillator controlled by a reactance tube which is in turn controlled by a phase discriminator which compares the separated bursts with the output of the oscillator. The burst synchronized signal source 263 may also be constructed in the form of an injection-locked oscillator or a ringing circuit.

The phase-synchronized output of the burst-synchronized signal source 263 is applied to the phase shift circuit 265 which, using suitable phase shift and phase delay networks, develops demodulating signals having prescribed phases of the chrominance signal. Using the notation adopted in Figure 2, the phase shift circuit 65 develops a trio of demodulating signals $a_R$, $a_B$, and $a_G$ which are applied to the control grids of a trio of tubes 267, 269, and 271 of the demodulating signal amplifier circuit 273. The outputs of each of the tubes 267, 269, and 271 of the demodulating signal amplifier circuit 273, are thereupon applied to the corresponding control grids 219 of the electron guns of the color kinescope 213.

Each of the control grids 219 of the electron guns of the color kinescope 213 are capacitively coupled to the corresponding one of the screen grids 275. The electron beam issuing from each of the cathodes 211 will thereupon be modulated by both a control grid and a screen grid to provide for more effective modulation of the beam; that is, the applying of the modulating signal to both a control grid and a screen grid has the same effect as increasing the control grid drive of the kinescope thereby reducing the demands made on the demodulating signal amplifier circuit 273. It is to be understood that the applying of the demodulating signal to both a control grid and a screen grid is an additional feature of the present invention intended to provide for improved operation of the color television receiver; the present invention may also be used in color television receivers where the demodulating signal is only applied to a single control grid in the paths of an electron beam without detracting from the benefits of the present invention.

The composite signal from the television signal receiver 243 is applied to the cathodes 211 of the color kinescope 213 by way of the constant-current, high-impedance driving circuit 10. The color kinescope responds to both the composite signal applied to its cathodes 211 and to the demodulating signals applied to the control grids 219 and the screen grid 275 and also to the horizontal and vertical deflection signals applied to the yokes 253 to reproduce the televised color image.

Adjustment of the potentiometers 266, 268, and 270, in the anode load circuits of each of the tubes 267, 269, and 271 of the demodulating signal amplifier circuit 273 provides control of the grid bias at each of the control grids 219 of the color kinescope. By proper adjustment of the potentiometers 266, 268, and 270, the light output at each component color of the color kinescope will provide for proper color balance of the reproduced image or for desired ratios of light intensity of the light output at each of the component colors.

Figure 11:
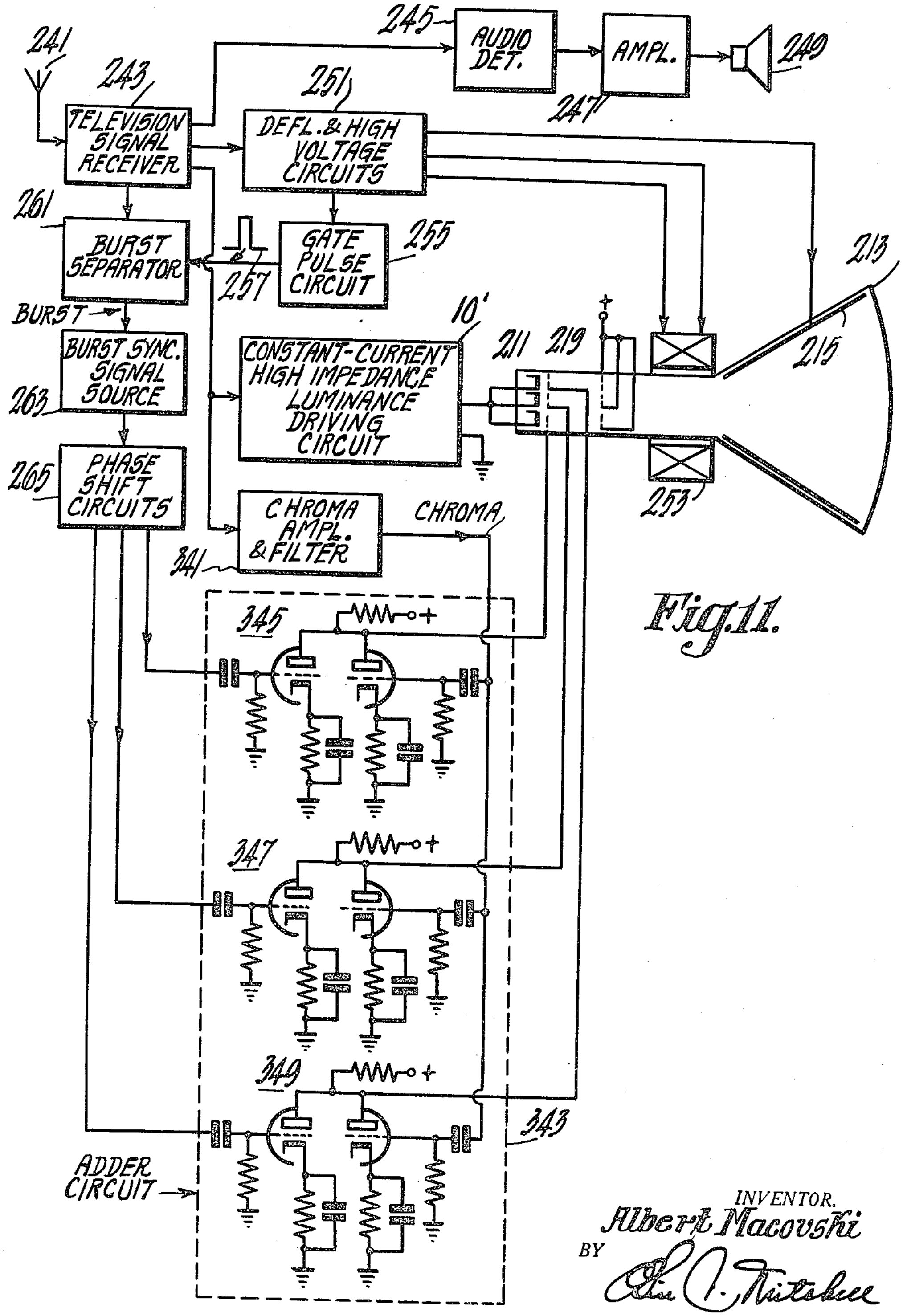

Figure 11 is a diagram of a color television receiver which uses another form of the present invention for kinescope processing of the color information. Circuits of the color television receiver of Figure 11 which perform the same functions as those circuits described in Figure 10, are assigned the same numerals.

The color television receiver of Figure 11 employs a constant-current, high-impedance luminance driving circuit 10' which, using high-impedance, constant-current driving circuits based on principles already described in the specification and having high driving impedance over, at least, the frequency range of the demodulated color difference signal information, applies the luminance signal to the cathodes 211 of the color kinescope 213. It is to be noted that the driving impedance of the constant-current, high-impedance luminance driving circuit 10' may have virtually zero impedance at the chrominance signal subcarrier frequency without affecting the kinescope demodulation process.

The chrominance signal information is filtered from the composite signal by the chroma amplifier and filter 341 to produce the chrominance signal or chroma which is then applied to the adder circuit 343. The adder circuit 343 consists of a trio of adders 345, 347, and 349, each consisting of a pair of triodes having a common anode resistance. The chrominance signal or chroma is applied to the control grid of one of each of the triodes of the adders 345, 347, and 349. The demodulating signals $a_G$, $a_B$, and $a_R$ are applied respectively to the control grids of the other of the triodes of the adders 345, 347, and 349. The common anode resistors of the adders 345, 347, and 349 are coupled to corresponding control grids of the color kinescope 213 to develop each of these control grids, both the chrominance signal and also the demodulating signal required at that control grid for introducing color difference signal information having proper color characteristics into the electron beam passing through that control grid. The electron beams, issuing from the cathodes 211 and being imparting therefrom with luminance signal information, thereupon pass through the control grids 219 to introduce into the electron beam, the previously mentioned color difference signal information; the color difference signal information is added to the luminance signal in the electron beam to produce therein the required component color signals. The electron beams, modulated by the component color signals, thereupon impinge on the target area of the color kinescope 213 and produce the televised color image.

*Color television receivers using color demodulators separate from the kinescope*

In the color television receivers of Figures 10 and 11 wherein the color information was processed within the kinescope, the constant-current, high-impedance driving circuits of the present invention prevent incorrect differential changes of current between the electron guns of the kinescope and also prevent the total current applied to the cathodes 211 of the color kinescope 213 from varying as a result of the demodulating signals applied to the control grids 219 of the color kinescope.

In color television receivers which do not process the color information in the kinescope, a similar problem, which is optimally solved by use of a constant-current, high-impedance driving circuit 10 of the present invention, is present. This problem arises from the fact that some types of color television receivers add luminance and chrominance difference signals within the color kinescope, and the changes in electron loading provided to a cathode driving circuit not functioning according to the present invention may also cause a deterioration in kinescope performance and in reproduced image.

Figure 12:
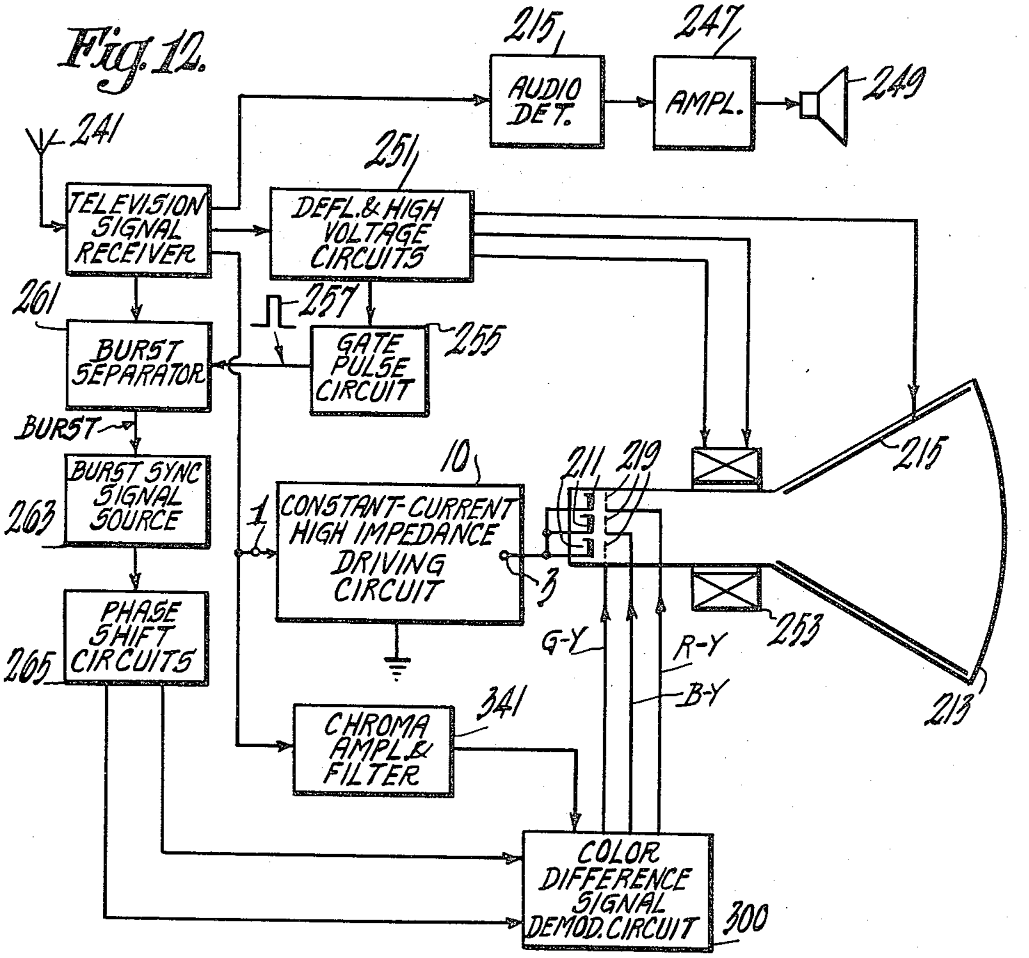

The color television receiver of Figure 12 is a receiver wherein the color kinescope 213 adds luminance signal information and color difference information in its electron guns. Circuits of Figure 12 which perform the same functions as those performed by similar circuits of the color television receivers of Figures 10 and 11 are provided with the same numerals.

In the color television receiver of Figure 12, the color television signal is applied by way of a constant-current, high-impedance driving circuit 10 to the cathodes 211 of the electron guns of the color kinescope 213. When the color television signal is not subjected to the processes of demodulation, this signal may be considered to be principally a luminance information signal. A color difference signal of correct amplitude which is added to the luminance signal will produce a corresponding component color information; for example, when the luminance or Y signal is combined with each of the $R-Y$, $B-Y$, or $G-Y$ color difference signals, the red (R), the blue (B), and the green (G) component color signals are produced.

The color television signal is applied to the chroma amplifier and filter 341, with the chrominance signal derived therein applied to the color difference signal demodulating circuit 300. The phase shift circuits 265 apply suitable demodulating signals to the color difference signal demodulating circuit 300 so that $R-Y$, $B-Y$, and $G-Y$ color difference signals are developed therein. For details of circuits for demodulating color difference signals from a color television signal, see for example, the paper entitled "Color Television Signal Receiver Demodulators" by Pritchard and Rhodes, published in the RCA Review, June 1953.

The $R-Y$, $B-Y$, and $G-Y$ color difference signals are applied to the control grids 219 of the electron guns which control the light output from the sections of the target area of the color kinescope 213 which produce green, blue, and red light, respectively. As a result of applying, say the luminance signal, to the cathode and the $R-Y$ color difference signal to the control grid of one of the electron guns, addition of these signals is provided in the electron beam issuing from the electron gun.

It is to be noted, however, that each of the color difference signals applied to the control grids of the trio of electron guns of the color kinescope 213 may cause different loading conditions on the cathodes of both electron guns. By using a constant-current high-impedance driving circuit 10 for providing current to the cathodes 211 of the electron guns, the applying of the color difference signals to the control grids of the electron guns will not cause fluctuation in the luminance-signal-varying current passing to the cathodes.

A further advantage of the use of a constant-current, high-impedance driving circuit in the color television receiver of Figure 12 is that the current issuing from the cathodes 211 will vary linearly with respect to the color television signal voltage applied to the input terminal 1 of the constant-current, high-impedance driving circuit 10.

Figure 13:
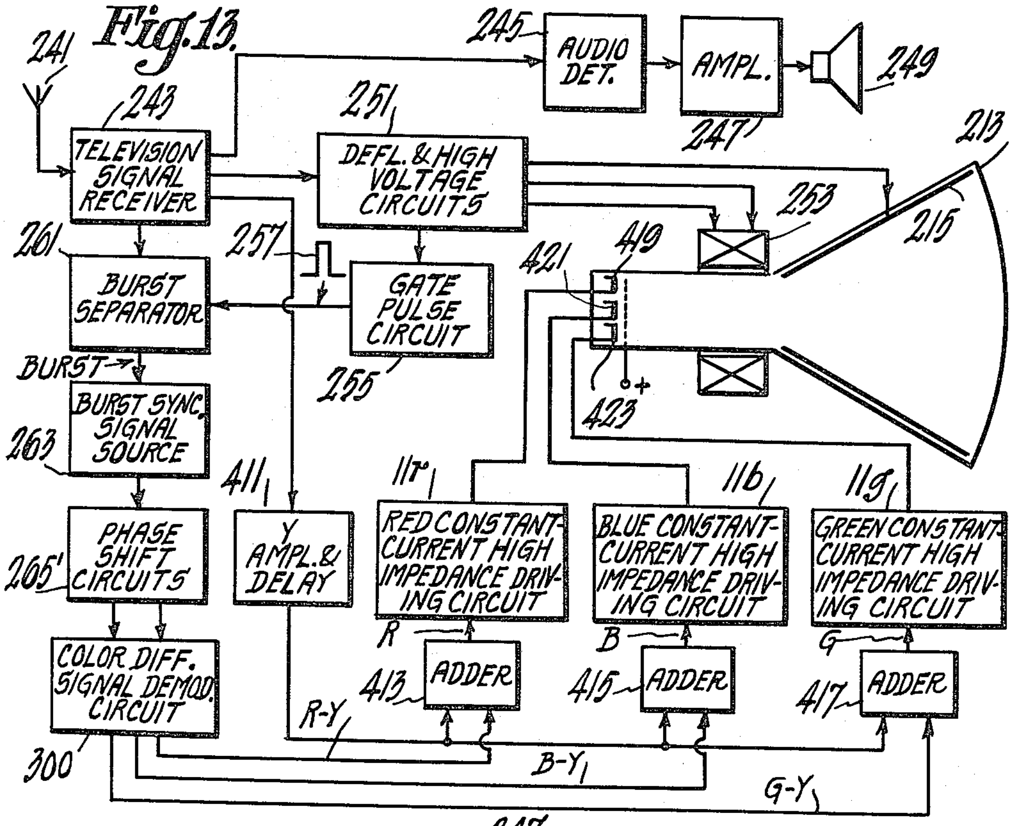

Figure 13 is a block diagram of another type of television receiver wherein the component color signals are formed independently of the color kinescope. The color television signal or luminance signal is passed through the Y amplifier and delay circuit 411 and applied therefrom simultaneously to each of the adder circuits 413, 415, and 417. $R-Y$, $B-Y$, and $G-Y$ color difference signals from the color difference signal demodulator circuit 300 are applied to the adder circuits 413, 415, and 417, respectively. The output signals of the adder circuits 413, 415, and 417 are the red, blue, and green color signals.

The color television receiver of Figure 13 uses a trio of constant-current, high-impedance driving circuits of the present invention. A red constant-current, high-impedance driving circuit **11*r* applies the red component color signal to the cathode of the red light controlling gun 419 of the color kinescope 230. The blue constant-current, high-impedance driving circuit 11*b* applies the blue component color signal to the cathode of the blue light controlling gun 421, and the green constant-current, high-impedance driving circuit 11*g* applies the green component color signal to the cathode of the green light controlling gun 423**.

By using the constant-current, high-impedance driving circuits **11*r*, 11*b*, and 11*g*, changes in electron beam current and therefore in driving-circuit loading derived entirely from the component color signal information applied to the cathodes of each of the electron guns will not produce any variation in the currents provided to the cathodes by the driving circuits 11*r*, 11*b*, and 11*g***.

*Monochrome television receiver*

Figure 14:
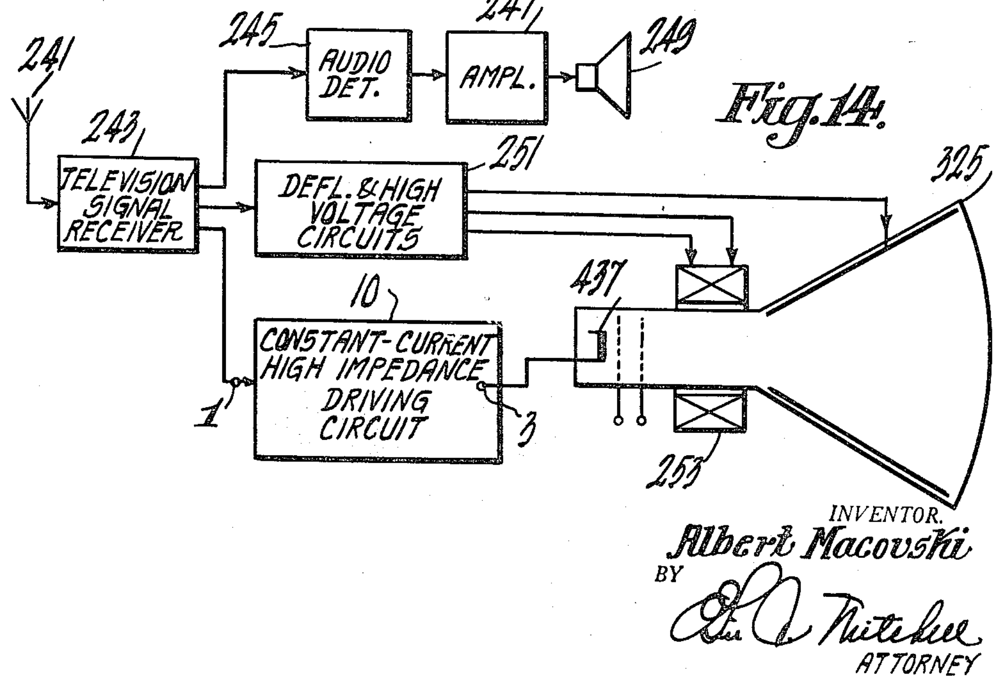
Figure 14 is a diagram of a monochrome type of television receiver which uses a constant-current, high-impedance driving circuit of the present invention for applying monochrome information modulating current to the cathode of an electron gun in a monochrome type of kinescope.

Figure 14 is a block diagram of a monochrome type of television receiver. This television receiver uses a monochrome kinescope 425. The television signal is applied to the cathode 437 by way of a constant-current, high-impedance driving circuit 10 of the present invention. By using the constant-current, high-impedance driving circuit 10 of the present invention, the current supplied to the cathode 437 will be entirely indicative of television signal information and will not contain variations derived from changes in loading of the driving circuit by the variations in electron beam intensity representing television signal information which issue from the cathode 437. In addition, the current from cathode 437 will vary linearly with the television signal voltage applied at the input terminal 1 of the constant-current, high-impedance driving circuit 10.

*Kinescope protection*

A constant-current, high-impedance driving circuit 10 of the present invention, whether used in a color television receiver or in a monochrome receiver, has an additional advantage in providing current protection to the kinescopes used in the receiver. This protection is derived from the fact that the current supply to the cathode or cathodes of the kinescope is directly a function of the television signal voltage applied to the constant-current, high-impedance driving circuit and will be relatively independent of improper and spurious changes of electron voltages of the kinescope thereby preventing the beam current in the kinescope from unduly increasing, causing either damage to the kinescope or changes in background of a reproduced image.

Having described the invention, what is claimed is:

1. In a color television receiver adapted to receive a color television voltage including color information, said color television receiver including a color kinescope having a plurality of electron guns each having a cathode and a control electrode, each of said electron guns providing a load to a cathode driving circuit which varies in accordance with the potential between the cathode and control electrode of that electron gun when said cathode is biased to be capable of providing emission, a cathode driving circuit to provide a total current to the cathodes of said plurality of electron guns which is a linear function of said color television voltage comprising in combination: means to derive different varying voltages related to color information from said color television voltage, means to apply each of said different voltages between the cathode and control electrode of a selected one of said plurality of electron guns; an amplifier circuit including an input circuit to which said color television voltage is applied and an output circuit coupled to each of the cathodes of said plurality of electron guns to provide current modulated by said color television voltage to said cathodes, said output circuit including high-impedance means for causing said modulated current applied to said cathodes to be independent of the variations of the electron gun load provided to said output circuit by said electron guns responsive to said different voltages whereby the total current from said electron guns in said color kinescope varies linearly with said color television voltage.

2. In a television receiver adapted to receive a television voltage including video information, said television receiver including a kinescope having an electron gun having a cathode and a control electrode, said electron gun providing a load to a cathode driving circuit which varies in accordance with the potential between the cathode and control electrode of that electron gun and with the current produced in that electron gun when said cathode is biased to be capable of providing emission, a cathode driving circuit to provide a total current to the cathode of said electron gun which is a linear function of said television voltage comprising in combination: means to apply a bias voltage between the cathode and control electrode of said electron gun; an amplifier circuit including an input circuit to which said television voltage is applied and an output circuit coupled to said cathode of said electron gun to provide current modulated by said television voltage to said cathode, said output circuit including high-impedance means for causing said modulated current applied to said cathode to be independent of the variation of the electron gun load provided to said output circuit by said electron gun responsive to said bias voltage and to the variation of gun current in accordance with said television voltage whereby the current in said electron gun in said kinescope varies linearly with said television voltage.

3. In a color television receiver adapted to receive a color television voltage including color information, said color television receiver including a color kinescope having a plurality of electron guns each having a cathode and a control electrode, each of said electron guns providing a load to a cathode driving circuit which varies in accordance with the potential between the cathode and control electrode of that electron gun and with the current produced in that electron gun when said cathode is biased to be capable of providing emission, a cathode driving circuit to provide a total current to the cathodes of said plurality of electron guns which is a linear function of said color television voltage comprising in combination: means to derive different color difference signal voltages related to color information from said color television voltage, means to apply each of said different color difference signal voltages between the cathode and control electrode of a selected one of said plurality of electron guns; an amplifier circuit including an input circuit to which said color television voltage is applied and an output circuit coupled to each of the cathodes of said plurality of electron guns to provide current modulated by said color television voltage to said cathodes, said output circuit including high-impedance means for causing said modulated current applied to said cathodes to be independent of the variations of the electron gun load provided to said output circuit by said electron guns responsive to said different color difference signal voltages whereby the total current from said electron guns in said color kinescope varies linearly with said color television voltage.

4. In combination: an electron flow device having a cathode from which an electron flow is capable of being emitted and a control electrode for controlling the intensity of said electron flow, said electron flow device capable of providing an impedance load to a cathode driving circuit which is a function of the potential between said cathode and said control electrode, a source of signal representing picture information, a cathode driving circuit having an input circuit and an output terminal and including means for causing the amplitude level of signal modulated current furnished to said output terminal responsive to signals applied to said input circuit to be substantially independent of variations in the magnitude of the impedance of any circuit coupled to said output terminal through which said modulated current is caused to flow, means to couple said picture information signal source to said input circuit of said driving circuit, means to couple said output terminal to said cathode of said electron flow device, means coupled to said signal source to derive a signal related to said picture information from said picture information signal, and means for applying said derived signal between said control electrode and said cathode.

5. In combination: an electron flow device having a flow electrode from which an electron flow is capable of being emitted and a control electrode capable of controlling the intensity of said electron flow, a source of video information signals having at least a first and lower frequency range and a second and higher frequency range; an amplifier circuit including an amplifier device having an input circuit and an output load and a fixed potential terminal, said output load being of substantially high impedance whereby capacitance is presented between said output load and said fixed potential terminal which provides capacitive loading in said second frequency range of said video signal, means to apply said video signal to said input circuit of said amplifier circuit; a negative capacity circuit coupled between said output load and said fixed potential terminal to substantially reduce the capacitive loading presented by said capacitance in said second frequency range, circuit means to couple current representing said video signals and presented in said output load to said flow electrode to modulate electron flow in said electron flow device in accordance with said video signals, and means coupled between said control electrode and said fixed potential terminal for further controlling the intensity of said electron flow.

6. In combination: an electron flow device having a flow electrode from which an electron flow is capable of being emitted and a control electrode capable of controlling the intensity of said electron flow, a source of video information signals having at least a first and lower frequency range and a second and higher frequency range; an amplifier circuit including an amplifier device having an input circuit and an output load and a fixed potential terminal, said output load being of substantially high impedance whereby a capacitance is presented between said output load and said fixed potential terminal which provides capacitive loading in said second frequency range of said video signal, means to apply said video signal to said input circuit of said amplifier circuit; circuit means connected between said output load and said flow electrode of said electron flow device to couple current from said output load representing said video signals to said flow electrode and to substantially reduce the capacitive loading provided by said capacitance between said output load and said fixed potential terminal, and circuit means coupled between said fixed potential terminal and said control electrode for controlling said electron flow in said electron flow device.

7. In combination: a kinescope including an electron gun having at least a cathode and control electrode; a first electron tube having a cathode, control grid, and an anode; a pentode having a cathode, control grid, and an anode; a fixed potential point; means to couple said cathode of said electron tube to said fixed potential point; means to couple the anode of said electron tube to the cathode and control grid of said pentode to cause a change in current in one direction through said first electron tube to produce a corresponding change in current in a second direction through said pentode and to provide an output terminal at which is provided current representing a difference between currents through both said first electron tube and said pentode; a source of energizing potential coupled to the anode of said pentode to produce current flow in said first electron tube and said pentode; means to apply video information signals between said control grid of said first electron tube and said fixed potential point; and means to couple current from said output terminal to the cathode of said electron gun.

8. In combination: a kinescope including an electron gun having at least a cathode and control electrode; a first electron tube having a cathode, control grid, and an anode; a pentode having a cathode, control grid, and an anode; a fixed potential point; means to couple said cathode of said electron tube to said fixed potential point; a resistance means to couple the anode of said electron tube to the cathode of said pentode; means to derive a bias for the control grid of said pentode from a potential produced by current from said first electron tube flowing through said resistance means to cause a change in current in one direction through said first electron tube to produce a corresponding change in current in a second direction through said pentode and to provide an output terminal at which current representing a difference between currents through both said first electron tube and said pentode, a source of energizing potential coupled to the anode of said pentode to produce current flow in said first electron tube and said pentode; means to apply video information signals between said control grid of said first electron tube and said fixed potential point to control the current through said first electron tube, and inductance means to couple current from said output terminal to the cathode of said electron gun.

9. In combination: a source of a composite color television signal in which component color information occurs at different phases, a color kinescope having a plurality of electron guns, each having a first and second control electrode, each of said electron guns capable of providing a load to a driving circuit which is a function of a potential difference between each first and second control electrode, said color kinescope capable of reproducing a color image in each of a plurality of component colors, a high-impedance, electron-gun driving circuit coupled to said source and responsive to said composite color television signal for producing an output current representative of said composite color television signal, said output current being independent of the magnitude of an output load through which said output current is passed, means to apply said output current to the first electrode of each of said plurality of electron guns whereby said plurality of electron guns provides a load for said output current, and means to apply periodic signals having a prescribed frequency and different phases corresponding to the phases at which color information relating to said plurality of component colors of said color kinescope occurs in said composite color television signal to corresponding second control electrodes of said electron guns.

10. In combination: a source of a composite color television signal in which component color information occurs at different phases, a color kinescope having a plurality of electron guns, each having a first, second, and third control electrode, said color kinescope capable of reproducing a color image in each of a plurality of component colors, a high impedance driving circuit coupled to said source and to said first electrodes of said plurality of electron guns and responsive to said composite color television signal for producing a total output current representative of said composite color television signal in said plurality of electron guns, said high impedance driving circuit including high-impedance means for causing said total output current to be independent of variations of voltages applied between said first, second, and third control electrodes, and means to apply periodic signals having a prescribed frequency and different phases corresponding to the phases at which color information relating to said plurality of component colors of said color kinescope in said composite color television signal to corresponding second and third control electrodes of said electron guns.

11. In combination: a source of a composite color television signal in which component color information occurs at different phases, a color kinescope having a plurality of electron guns, each having a first and second control electrode, said color kinescope capable of reproducing a color image in each of a plurality of component colors, a high impedance driving circuit coupled to said source and to said first electrodes of said plurality of electron guns and responsive to said composite color television signal for producing a total output current representative of said composite color television signal in said plurality of electron guns, said high-impedance driving circuit including high-impedance means for causing said total output current to be independent of variations of voltages applied between said first and second control electrodes, and means to apply periodic signals having a prescribed frequency and different phases corresponding to the phases at which color information relating to said plurality of component colors of said color kinescope in said composite color television signal to corresponding second control electrodes of said electron guns.

12. In combination: a source of a color television signal including both luminance and chrominance signals, said color television signal capable of being converted to each of a polarity of component color television signals by beating said color television signal with a demodulating signal having a prescribed frequency and phase in the electron gun of a color kinescope, a color kinescope having a trio of electron guns, each of said trio of electron guns having a first and second control electrode and adapted to control the light output at one of a trio of component colors reproducible by said color kinescope, a driving circuit coupled to said source and responsive to said color television signals and operatively connected to drive the first electrodes of each of said trio of electron guns, said driving circuit comprising high impedance means for causing the total current provided by said driving circuit to said first electrodes of said trio of electron guns to be relatively independent of voltages applied to said second control electrodes, a circuit to provide a trio of demodulating signals each having said prescribed frequency, each of said demodulating signals having a phase corresponding to a phase for converting said color television signal to a component color signal, said phases corresponding to phases for producing component color signals from said color television signal, which are related to said trio of component colors reproducible by said color kinescope, and means to apply said demodulating signals to said second control electrode of said trio of electron guns to cause said color television signal to beat with one of said demodulating signals in each electron gun.

13. In combination: a source of a wideband color television signal including luminance and chrominance signals and also color synchronizing bursts having a reference frequency and phase, said color television signal capable of being converted to each of a plurality of component color television signals by beating said color television signal with a demodulating signal having a prescribed frequency and phase related to said reference frequency and phase in the electron gun of a color kinescope, a color kinescope having a trio of electron guns each having a first and second control electrode and adapted to reproduce a color in each of a trio of component colors, a fixed potential point, an impedance matching filter network coupled to said source and responsive to said color television signals and operatively connected from all of the first electrodes of each of said trio of electron guns to said fixed potential point to provide all components of said wideband color television signal to said first electrodes of said trio of electron guns from a very high impedance relative to any impedance developed between said first electrodes and said fixed potential point, a circuit synchronized by said bursts to provide a trio of demodulating signals each having said prescribed frequency with each of said demodulating signals having a phase corresponding to a phase for converting said color television signal to a component color signal which is related to one of said trio of component colors reproducible by said color kinescope, and means to apply each of said demodulating signals to said second control electrode of one of said trio of electron guns to cause said color television signal to therein beat with said demodulating signal in that electron gun.

14. In a color television receiver adapted to receive a composite color television signal including color synchronizing bursts having a prescribed frequency and a reference phase, said composite color television signal capable of being developed into each of a trio of different component color signals representing the component colors of a televised image by mixing said composite color television signal in the electron gun of a color kinescope with one of a trio of demodulating signals having the frequency of said bursts and having a predetermined phase related to said reference phase, a kinescope color processing circuit comprising in combination: a color kinescope having a trio of electron guns each having a first, second, and third control electrode and having a target area whereon electron beams from said electron guns develop color light emission corresponding to each of said component colors of a televised image, an amplifier circuit having an input circuit and an output circuit, said output circuit having a high resistance load and also a capacitance coupled between said high resistance load and a fixed potential point, means to couple said resistance load to the first electrode of each of said trio of electron guns, a negative capacity circuit coupled between said output load and said fixed potential point to substantially cancel said capacity, signal developing means responsive to said color synchronizing bursts for developing a reference signal having the frequency of said bursts and a phase prescribed by said bursts, a phase shift circuit coupled to said signal developing means and responsive to said reference signal for developing a trio of demodulating signals each having the frequency of said bursts and each phased to be capable of developing a different component color signal from said composite color television signal upon being mixed with said composite color television signal, and means to apply each of said trio of demodulating signals to selected control electrodes of the corresponding electron guns of said color kinescope which bombard said target area to produce color light emission corresponding to the component color signal developed from the mixing of said composite color television signal and the applied demodulating signal in that electron gun.

15. In a color television receiver adapted to receive a composite color television signal including color synchronizing bursts having a prescribed frequency and a reference phase, said composite color television signal capable of being developed into each of a trio of different component color signals representing the component colors of a televised image by mixing said composite color television signal in the electron gun of a color kinescope with one of a trio of demodulating signals having the frequency of said bursts and having a predetermined phase related to said reference phase, a kinescope color processing circuit comprising in combination: a color kinescope having a trio of electron guns each having a first, second, and third control electrode and having a target area whereon electron beams from said electron guns develop color light emission corresponding to each of said component colors of a televised image, a first amplifier means having an input circuit and an anode terminal, means to apply said composite color television signal to said input circuit, a second amplifier means having at least a cathode and a control electrode and an anode and a high potential coupled to said anode, means to couple said cathode and control electrode of said second amplifier means to said anode of said first amplifier means to cause said second amplifier means to function as a load to said first amplifier means to provide from said cathode a driving point capable of producing therefrom a modulated current representative of said composite color television signal, filter means coupling said driving point to the first control electrodes of the trio of electron guns of said color kinescope, signal developing means responsive to said color synchronizing bursts for developing a reference signal having the frequency of said bursts and a phase prescribed by said bursts, a phase shift circuit coupled to said signal developing means and responsive to said reference signal for developing a trio of demodulating signals each having the frequency of said bursts and each phased to be capable of developing a different component color signal from said composite color television signal upon being mixed with said composite color television signal in an electron gun of said color kinescope, and means to apply each of said trio of demodulating signals to selected control electrodes of the corresponding electron guns of said color kinescope which bombard said target area to produce color light emission corresponding to the component color signal developed in that electron gun.

16. In a color television receiver adapted to receive a composite color television signal including color synchronizing bursts having a prescribed frequency and a reference phase, said composite color television signal capable of being developed into each of a trio of different component color signals representing the component colors of a televised image by mixing said composite color television signal in the electron gun of a color kinescope with one of a trio of demodulating signals having the frequency of said bursts and having a predetermined phase related to said reference phase, a kinescope color processing circuit comprising in combination: a color kinescope having a trio of electron guns each having a plurality of electrodes and capable of providing an impedance to a current-supplying circuit which is a function of the potential differences between said electrodes, said color kinescope having a target area whereon electron beams from said electron guns develop color light emission corresponding to each of said component colors of a televised image, a driving circuit having an input circuit to which said color television signal is applied and an output terminal coupled to one of the electrodes of each of said electron guns to provide a total current to said electrodes which is modulated by said color television signal and whose magnitude is independent of variations of potentials between the control electrodes of each of said electron guns, filter means to separate a higher frequency range of components from said composite color television signal, said separated higher frequency range consisting of a chrominance signal, means to apply said chrominance signal to a selected control electrode of each of the electron guns of said color kinescope, signal developing means responsive to said color synchronizing bursts for developing a reference signal having the frequency of said bursts and a phase prescribed by said bursts, a phase shift circuit coupled to said signal developing means and responsive to said reference signal for developing a trio of demodulating signals each having the frequency of said bursts and each phased to be capable of developing a component color signal corresponding to a component color of said televised image from said composite color television signal, and means to apply each of said trio of demodulating signals to prescribed control electrodes of the corresponding electron guns of said color kinescope which bombard said target area to cause mixing of said color television signal and of the applied demodulating signal in that electron gun and to produce color light emission corresponding to the component color signal developed in that electron gun.

17. A kinescope color processing system comprising in combination: a circuit for providing a composite color television signal including luminance signal information over a wide frequency range and also chrominance signal information in a narrow, higher frequency range, said chrominance signal including modulations representative of color difference signals each occurring at a phase of said chrominance signal, a color kinescope having a trio of electron guns each having a first and second control electrode, said color kinescope capable of producing a televised image in each of a trio of component colors, an amplifier having an input circuit and an output circuit, means to apply said composite color television signal from said source to said input circuit of said amplifier, an impedance-matching filter coupled between the output circuit of said amplifier and the first control electrode of said electron guns to provide a high driving impedance for at least the chrominance signal range of said composite color television signal to said first control electrodes, a circuit to develop periodic demodulating signals having first, second, and third phases of said chrominance signal, said first, second, and third phases of said chrominance signal corresponding to a trio of color information signals which when combined with luminance signal information develop component color information corresponding to component colors reproducible by said color kinescope, and means to apply said first, second, and third periodic demodulating signals to the second control electrodes of the respective electron guns which control the emission of electron beams to corresponding color light emitting areas.

18. A kinescope color processing system comprising in combination, a circuit for providing a composite color television signal including luminance signal information over a wide frequency range and also chrominance signal information in a narrow, higher frequency range, said chrominance signal including modulations representative of color difference signals each at a phase of said chrominance signal, a color kinescope having a trio of electron guns, each of said electron guns having a first and second control electrode, said color kinescope capable of producing a televised image in each of a trio of component colors, a band-pass filter circuit to separate said chrominance signal from said composite color television signal, a high-impedance driving circuit coupled to said source of said composite color television signal to provide a high-impedance source of modulated current representing said composite color television signal, a second high-impedance driving circuit coupled to the output of said band-pass filter to provide a high-impedance source of modulated current representing said chrominance signal, means to couple said high-impedance sources of modulated currents representing both said composite signal and said chrominance signal to the first electrodes of said trio of electron guns, and means to apply differently phased periodic demodulating signals to the second electrodes of said trio of electron guns, each of said periodic demodulating signals having a phase corresponding to the phase of the color information in said chrominance signal which when combined with luminance signal information corresponds to a component color reproducible by said color kinescope.

19. A kinescope color processing system comprising in combination: a circuit for providing a composite color television signal including luminance signal information over a wide frequency range and also chrominance signal information in a higher and narrower frequency range, said chrominance signal including modulations representative of color difference signals each at a phase of said chrominance signal, a color kinescope having a trio of electron guns each having a cathode and control grid, said color kinescope capable of producing a televised image in each of a trio of component colors, an amplifier having an input circuit and an output circuit, means to apply said composite color television signal from said source to said input circuit of said amplifier, circuit means coupled between the output circuit of said amplifier and the cathodes of said electron guns to apply said composite color television signal through a high impedance to said cathodes, a circuit to develop periodic demodulating signals having first, second, and third phases of said chrominance signal, said first, second, and third phases of said chrominance signal corresponding to a trio of color information signals each of which when combined with luminance signal information develops component color information corresponding to a component color reproducible by said color kinescope, and means to apply said first, second, and third periodic demodulating signals to the corresponding control grids of said electron guns which control the emission of electron beams to corresponding color light emitting areas.

20. In a color television receiver adapted to receive a color television signal which includes both a luminance signal and a chrominance signal and also color synchronizing bursts having a burst frequency and phase, said chrominance signal including modulations representative of a plurality of color difference signals, each transmitted at a prescribed phase of said chrominance signal and capable of being demodulated by heterodyning said chrominance signal with a periodic signal of burst frequency and of prescribed phase relative to burst phase, a kinescope color adding circuit comprising in combination: a color kinescope having a trio of electron guns, each capable of controlling the light output of said color kinescope at a component color, each of said trio of electron guns having a cathode and a control grid, a circuit to provide a color television signal, a demodulating signal developing circuit including apparatus coupled to said signal providing circuit to derive from said color synchronizing bursts a plurality of demodulating signals having prescribed phases of said chrominance signal, a color demodulator circuit including a filter to derive a chrominance signal from said color television signal and operatively connected to said demodulating signal developing circuit to develop a trio of different color difference signals from said chrominance signal responsive to said plurality of demodulating signals, each of said trio of color difference signals capable of being combined with said luminance signal to develop a component color signal representative of a component color reproducible by said color kinescope, means to apply each of said color difference signals to the control grid of the corresponding one of said electron guns which controls the light output of the corresponding component color, a cathode driving circuit having an input circuit to which said color television signal is applied and an output circuit coupled to the cathodes of said trio of electron guns, said output circuit including high-impedance circuit means to provide modulated current representative of said color television signal to said cathodes, said modulated current having an amplitude independent of the variation of the potential of the control grid of each electron gun relative to the potential of the cathode of that electron gun responsive to the color difference signal applied to that control grid.

21. In a color television receiver adapted to receive a color television signal which includes both a luminance signal and a chrominance signal and also color synchronizing bursts having a burst frequency and phase, said chrominance signal including modulations representative of a plurality of color difference signals, each transmitted at a prescribed phase of said chrominance signal and capable of being demodulated by heterodyning said chrominance signal with a periodic signal of burst frequency and of prescribed phase relative to burst phase, a kinescope color adding circuit comprising in combination: a color kinescope having a trio of electron guns, each capable of controlling the light output of said color kinescope at a component color, each of said trio of electron guns having a cathode and a control grid, a circuit to provide a color television signal, a demodulating signal developing circuit including apparatus coupled to said signal providing circuit to derive from said color synchronizing bursts a plurality of demodulating signals having prescribed phases of said chrominance signal, a color demodulator circuit including a filter to derive a chrominance signal from said color television signal and operatively connected to said demodulating signal developing circuit to develop a trio of different color difference signals from said chrominance signal responsive to said plurality of demodulating signals, each of said trio of color difference signals capable of being combined with said luminance signal to develop a component color signal representative of a component color reproducible by said color kinescope, adder circuit means to combine said color television signal with each of said trio of color difference signals to develop a trio of component color signals, a trio of cathode driving circuits each having an input circuit to which a selected component color signal is applied and an output circuit coupled to the cathode of the electron gun which controls the color light output corresponding to the selected component color signal, each output circuit including high-impedance circuit means to provide modulated current representative of said selected component color signal to the respective cathode and to cause the modulated current provided to that cathode to be independent of changes in loading presented to that output circuit by that cathode due to the current emitted by that cathode being modulated by said selected component color signal.

22. In a color television receiver adapted to receive a color television signal including a composite signal which contains both a luminance signal indicative of monochrome image information and a chrominance signal indicative of color difference signal information and also including color synchronizing bursts bearing reference phase information related to a phase of said chrominance signal, said composite signal capable of being demodulated to provide a component color signal by modulating said composite signal by a sinusoidal demodulating signal having the mean frequency of said chrominance signal and also a phase corresponding to color difference signal information in said chrominance signal corresponding to the color desired for said component color signal, said color television receiver also including a color kinescope having a plurality of electron guns each having a cathode and a control grid, said color kinescope including a target area on which electron beams provided by said electron guns impinge to cause illumination at colors corresponding to component color signals, means to process said composite signal in said color kinescope, comprising in combination: means to apply said composite signal to the cathode of each of said plurality of electron guns, means to develop from said color synchronizing bursts a reference signal having the frequency of said bursts and having a phase accurately synchronized to the phase of said bursts; means coupled to said reference signal developing circuit to develop a plurality of demodulating signals having the mean frequency of said chrominance signal and having different phases corresponding to different phases of said chrominance signal; means to apply each of said plurality demodulating signals to the control grid of the electron gun of said color kinescope which controls the light output of the color kinescope at the color corresponding to the color information at the phase of the demodulating signal in the chrominance signal whereby the component color signals are introduced into the electron beams impinging on the target area of said color kinescope to produce visible light corresponding to a televised image represented by said color television signal.

23. In a color television receiver adapted to receive a color television voltage including color information and color synchronizing bursts, said color synchronizing bursts having prescribed frequency and phase, said color television receiver including a color kinescope having a plurality of electron guns each having a cathode and a control electrode, each of said electron guns providing a load to a cathode driving circuit which varies in accordance with the potential between the cathode and control electrode of that electron gun when said cathode is biased to be capable of providing emission, a cathode driving circuit to provide a total current to the cathodes of said plurality of electron guns which is a linear function of said color television voltage comprising in combination: means to derive a plurality of sinusoidal voltages having burst frequencies and having different phases as referred to burst phase from said color synchronizing burst, means to apply each of said sinusoidal voltages between the cathode and control electrode of a selected one of said plurality of electron guns; an amplifier circuit including an input circuit to which said color television voltage is applied and an output circuit coupled to each of the cathodes of said plurality of electron guns to provide current modulated by said color television voltage to said cathodes, said output circuit including high impedance means for causing said modulated current applied to said cathodes to be independent of the variations of the electron gun load provided to said output circuit by said electron guns responsive to said sinusoidal voltages whereby the total current from said electron guns in said color kinescope varies linearly with said color television voltage.

24. In a television receiver, the combination comprising a kinescope including a cathode and a control grid, said cathode emitting electrons the flow of which constitutes the beam current of the kinescope, said kinescope having a control grid-cathode voltage versus beam current characteristic which exhibits nonlinearities in the desired operating range, means for coupling said kinescope to a point of reference potential whereby said kinescope presents an impedance of a first magnitude between said cathode and said point of reference potential, a source of video signals coupled between said cathode and said point of reference potential and presenting an effective internal impedance of a second magnitude appreciably greater in magnitude than said first magnitude to said kinescope, said source of video signals comprising a video signal amplifying device having an input electrode and an output electrode, means for applying signals representative of received television signals to said input electrode to control the flow of current in said amplifying device, an amplifying device load resistance coupled between said output electrode and said point of reference potential, the value of said resistance being chosen to be appreciably greater than said impedance presented by said kinescope, and means for providing a direct current connection between said output electrode and said cathode whereby the kinescope beam current is varied in accordance with the signals applied to said amplifying device input electrode and such beam current variations are substantially independent of the nonlinearities of said kinescope control grid-cathode voltage versus beam current characteristic.

25. Apparatus in accordance with claim 24 wherein said television receiver is a color television receiver, wherein the signals applied to said amplifying device input electrode are representative of received composite color television signals, including a luminance component and modulated color subcarrier waves, wherein said kinescope is a color kinescope, and wherein means are provided for varying the potential of said kinescope control grid in accordance with oscillations of color subcarrier frequency.

26. Apparatus in accordance with claim 24 wherein said received television signals are composite color television signals including a luminance component and modulated color subcarrier waves representative of chrominance information, wherein said signals applied to said amplifying device input electrode are representative of the said luminance component, wherein means are provided for recovering said chrominance information from said modulated color subcarrier waves, and wherein said chrominance information recovering means is coupled to said kinescope control grid for varying the potential of said kinescope control grid in accordance with said recovered chrominance information.

27. Apparatus in accordance with claim 26 wherein said kinescope is a color image reproducing device including second and third cathodes with respectively associated second and third control grids in addition to said first-named cathode and its respectively associated first-named control grid, all of said cathodes being directly connected to each other, said second and third control grids being coupled to said chrominance information recovering means, and wherein the coupling between said chrominance information recovering means and each of said control grids is such that the potential of each control grid is varied in accordance with information representative of a respectively different component color whereby the total kinescope beam current constituting the sum of the respective beam currents associated with each of said cathodes is controlled substantially exclusively in accordance with the signals representative of said luminance component applied to said amplifying device input electrode and the differential between respective ones of the individual beam currents constituting said sum is determined by the differential between the respective potentials on the respectively associated kinescope control grids caused by the respective component color representative signals applied thereto whenever said applied component color representative signals cause such a potential differential to exist.

28. In a television receiver, the combination comprising a video amplifying device including a cathode, control grid, and anode, means for connecting said amplifying device cathode to a point of fixed potential, means for applying video signals to said amplifying device control grid, means providing a direct current connection between said amplifying device anode and said kinescope cathode, said kinescope presenting an impedance of a first magnitude between said cathode and said point of fixed potential, and means for causing signal responsive kinescope beam current variations to be substantially independent of any concomitant variations in said impedance presented by said kinescope, said last named means comprising a plurality of additional interconnected circuit elements coupled between said anode and said point of fixed potential, said additional interconnected circuit elements constituting the load impedance for said amplifying device apart from said impedance presented by said kinescope and providing in total effect a net video load impedance which is appreciably greater in magnitude than said impedance presented by said kinescope.

References Cited in the file of this patent

UNITED STATES PATENTS

| | | |
|---|---|---|
| 2,240,281 | Ballard | Apr. 29, 1941 |
| 2,243,599 | Herbst | May 27, 1941 |
| 2,296,050 | Poch | Sept. 15, 1942 |
| 2,301,522 | Cawein | Nov. 10, 1942 |
| 2,540,646 | Bernard | Feb. 6, 1951 |
| 2,674,650 | Houghton | Apr. 6, 1954 |
| 2,718,551 | Gray | Sept. 20, 1955 |
| 2,742,522 | Law | Apr. 17, 1956 |
| 2,800,528 | Beste | July 23, 1957 |
| 2,801,364 | Janssen | July 30, 1957 |
| 2,807,662 | Mattingly | Sept. 24, 1957 |
| 2,828,357 | Fyler et al. | Mar. 25, 1958 |